US010718224B2

(12) United States Patent
Davis, III et al.

(10) Patent No.: US 10,718,224 B2
(45) Date of Patent: Jul. 21, 2020

(54) AFT FRAME ASSEMBLY FOR GAS TURBINE TRANSITION PIECE

(71) Applicant: General Electric Company, Schenectady, NY (US)

(72) Inventors: Charles Lewis Davis, III, Simpsonville, SC (US); Kevin Weston McMahan, Greenville, SC (US); Wei Chen, Glastonbury, CT (US); Scott Robert Simmons, Greenville, SC (US)

(73) Assignee: General Electric Company, Schnectady, NY (US)

( * ) Notice: Subject to any disclaimer, the term of this patent is extended or adjusted under 35 U.S.C. 154(b) by 215 days.

(21) Appl. No.: 15/783,256

(22) Filed: Oct. 13, 2017

(65) Prior Publication Data

US 2019/0112936 A1   Apr. 18, 2019

(51) Int. Cl.
| F02C 7/18 | (2006.01) |
| F01D 9/06 | (2006.01) |
| F01D 9/02 | (2006.01) |
| F01D 25/12 | (2006.01) |
| F02C 3/04 | (2006.01) |
| F02C 7/12 | (2006.01) |

(52) U.S. Cl.
CPC .............. *F01D 9/065* (2013.01); *F01D 9/023* (2013.01); *F01D 25/12* (2013.01); *F02C 3/04* (2013.01); *F02C 7/12* (2013.01); *F02C 7/18* (2013.01); *F05D 2260/20* (2013.01); *F05D 2260/202* (2013.01); *F05D 2260/204* (2013.01)

(58) Field of Classification Search
None
See application file for complete search history.

(56) References Cited

U.S. PATENT DOCUMENTS

| 4,938,805 A  * | 7/1990 | Haydon ................. C22C 19/07 148/408 |
| 6,412,268 B1 * | 7/2002 | Cromer .................. F01D 9/023 60/760 |
| 6,546,627 B1 * | 4/2003 | Sekihara ................ B23P 6/005 29/402.08 |
| 6,769,257 B2 | 8/2004 | Kondo et al. |
| 8,245,515 B2 | 8/2012 | Davis |

(Continued)

FOREIGN PATENT DOCUMENTS

WO        2017105405 A1    6/2017

*Primary Examiner* — Gerald L Sung
*Assistant Examiner* — Marc J Amar
(74) *Attorney, Agent, or Firm* — Fletcher Yoder, P.C.

(57) ABSTRACT

An aft frame assembly has a main body with an upstream facing surface, a downstream facing surface, a radially outer facing surface and a radially inner facing surface. Feed hole inlets are located on the upstream facing surface and radially outward of the outer sleeve so that the feed hole inlets are located to receive input from a high pressure plenum. The feed hole inlets are coupled to cooling channels that pass through the main body. Microchannels are formed in or near the radially inner facing surface and the downstream facing surface. The cooling channels are connected to and terminate in the microchannels. Exit holes are connected to the plurality of microchannels, and the exit holes are located radially outward of the transition piece and radially inward of the outer sleeve. The exit holes are located to exhaust into the cooling annulus.

23 Claims, 8 Drawing Sheets

(56) References Cited

U.S. PATENT DOCUMENTS

| | | | |
|---|---|---|---|
| 8,499,566 B2 | 8/2013 | Lacy | |
| 8,651,805 B2 * | 2/2014 | Lacy | F01D 5/186 |
| | | | 415/178 |
| 8,707,705 B2 | 4/2014 | Berry et al. | |
| 8,956,104 B2 | 2/2015 | Lacy | |
| 9,255,484 B2 * | 2/2016 | Cihlar | F01D 9/023 |
| 9,297,262 B2 | 3/2016 | Zhang | |
| 9,574,498 B2 * | 2/2017 | Fadde | F02C 7/141 |
| 10,072,515 B2 * | 9/2018 | Fleuriot | F01D 9/023 |
| 2001/0037646 A1 * | 11/2001 | Shimizu | F01D 9/023 |
| | | | 60/752 |
| 2002/0112483 A1 * | 8/2002 | Kondo | F01D 9/023 |
| | | | 60/796 |
| 2009/0324387 A1 * | 12/2009 | Turaga | F01D 9/023 |
| | | | 415/115 |
| 2010/0003128 A1 * | 1/2010 | Chila | F01D 9/023 |
| | | | 415/182.1 |
| 2010/0034643 A1 * | 2/2010 | Davis, Jr. | F01D 9/023 |
| | | | 415/144 |
| 2011/0048030 A1 * | 3/2011 | Berry | F01D 9/023 |
| | | | 60/806 |
| 2011/0162378 A1 * | 7/2011 | Chila | F01D 9/023 |
| | | | 60/752 |
| 2012/0079828 A1 * | 4/2012 | Saitou | F01D 9/023 |
| | | | 60/740 |
| 2012/0210720 A1 * | 8/2012 | McMahan | F01D 9/023 |
| | | | 60/760 |
| 2012/0234018 A1 * | 9/2012 | Cihlar | F01D 9/023 |
| 2013/0234396 A1 * | 9/2013 | Willis | F01D 9/023 |
| | | | 277/312 |
| 2014/0000267 A1 * | 1/2014 | Melton | F01D 9/023 |
| | | | 60/752 |
| 2015/0082795 A1 * | 3/2015 | Fadde | B22F 7/08 |
| | | | 415/116 |
| 2015/0118033 A1 | 4/2015 | Smith et al. | |
| 2015/0369068 A1 * | 12/2015 | Kottilingam | B22F 7/08 |
| | | | 415/116 |
| 2018/0051578 A1 * | 2/2018 | Marlow | F01D 9/023 |
| 2018/0100436 A1 * | 4/2018 | DiCintio | F01D 9/023 |
| 2019/0112936 A1 | 4/2019 | Davis, III et al. | |
| 2019/0112937 A1 | 4/2019 | Davis, III et al. | |
| 2019/0112943 A1 | 4/2019 | Davis, III et al. | |
| 2019/0113230 A1 | 4/2019 | Simmons et al. | |

* cited by examiner

AFT FRAME ASSEMBLY FOR GAS TURBINE TRANSITION PIECE

BACKGROUND OF THE INVENTION

The apparatus described herein relates generally to aft frame assemblies, and more specifically, to an aft frame assembly for a transition piece of a gas turbine where the aft frame assembly includes microchannel cooling slots.

Turbine systems are widely utilized in fields such as power generation. For example, a conventional gas turbine system includes a compressor, a combustor, and a turbine. In a conventional gas turbine system, compressed air is provided from the compressor to the combustor. The air entering the combustor is mixed with fuel and combusted. Hot gases of combustion flow from the combustor to the turbine to drive the gas turbine system and generate power.

In a typical arrangement, an annular array of combustors is connected to the first stage of the turbine by a plurality of transition pieces. The transition pieces are each shaped at one end to conform to respective combustor liners, and at an opposite end to conform to the inlet of the turbine. Thus, at the opposite (or downstream) end, a transition piece has an aft frame by which the transition piece is secured to the turbine. An impingement sleeve may surround the transition duct, and may be used to direct working fluid discharged from the compressor into contact with the transition piece. This working fluid eventually mixes with the fuel in the combustor.

Currently, some of the working fluid that enters the flow path between the transition piece and the surrounding impingement sleeve is removed through holes in the aft frame. This working fluid, which is used to cool the aft frame, dumps into the hot gas from the combustor just before the hot gas enters the turbine. The problem with this current cooling method is that this working fluid does not always reach the areas of the aft frame that need to be cooled. The downstream face and downstream corners of the aft frame are areas in need of cooling, but in the past it has been very difficult to cool this areas.

BRIEF DESCRIPTION OF THE INVENTION

In an aspect of the present invention, an aft frame assembly for a transition piece of a gas turbine is provided. The transition piece is located within an outer sleeve having a plurality of cooling holes. A cooling annulus is formed in a space between the transition piece and the outer sleeve. A high pressure plenum surrounds an exterior of the outer sleeve. The aft frame assembly includes a main body having an upstream facing surface, a downstream facing surface, a radially outer facing surface and a radially inner facing surface. A plurality of feed hole inlets are located on the upstream facing surface and radially outward of the outer sleeve so that the feed hole inlets are located to receive input from the high pressure plenum. The feed hole inlets are coupled to a plurality of cooling channels passing through the main body. A plurality of microchannels are formed in or near the radially inner facing surface and the downstream facing surface, and the cooling channels are connected to and terminate in the microchannels. A plurality of exit holes are connected to the plurality of microchannels, and the exit holes are located radially outward of the transition piece and radially inward of the outer sleeve. The exit holes are located to exhaust into the cooling annulus.

In another aspect of the present invention, a transition piece has an aft frame assembly. The transition piece is located within an outer sleeve having a plurality of cooling holes. A cooling annulus is formed in a space between the transition piece and the outer sleeve. A high pressure plenum surrounds an exterior of the outer sleeve. The aft frame assembly has a main body comprising an upstream facing surface, a downstream facing surface, a radially outer facing surface and a radially inner facing surface. A plurality of feed hole inlets are located on the upstream facing surface and radially outward of the outer sleeve so that the feed hole inlets are located to receive input from the high pressure plenum. The feed hole inlets are coupled to a plurality of cooling channels passing through the main body. A plurality of microchannels are formed in or near the radially inner facing surface and the downstream facing surface. The cooling channels are connected to and terminate in the microchannels. A plurality of exit holes are connected to the plurality of microchannels, and the exit holes are located radially outward of the transition piece and radially inward of the outer sleeve. The exit holes are located to exhaust into the cooling annulus.

In yet another aspect of the present invention, a gas turbine includes a compressor and a combustion section disposed downstream from the compressor. The combustion section is in fluid communication with the compressor. A turbine is disposed downstream from the combustion section. The combustion section includes an aft frame assembly having a main body with an upstream facing surface, a downstream facing surface, a radially outer facing surface and a radially inner facing surface. The combustion section has a transition piece located within an outer sleeve having a plurality of cooling holes. A cooling annulus is formed in a space between the transition piece and the outer sleeve. A high pressure plenum surrounds an exterior of the outer sleeve. The aft frame has a plurality of feed hole inlets located on the upstream facing surface and radially outward of the outer sleeve so that the feed hole inlets are located to receive input from the high pressure plenum. The feed hole inlets are coupled to a plurality of cooling channels passing through the main body. A plurality of microchannels are formed in or near the radially inner facing surface and the downstream facing surface. The cooling channels are connected to and terminate in the microchannels. A plurality of exit holes are connected to the plurality of microchannels, and the exit holes are located radially outward of the transition piece and radially inward of the outer sleeve. The exit holes are located to exhaust into the cooling annulus.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component, and perpendicular to the radial direction.

Figure 1:
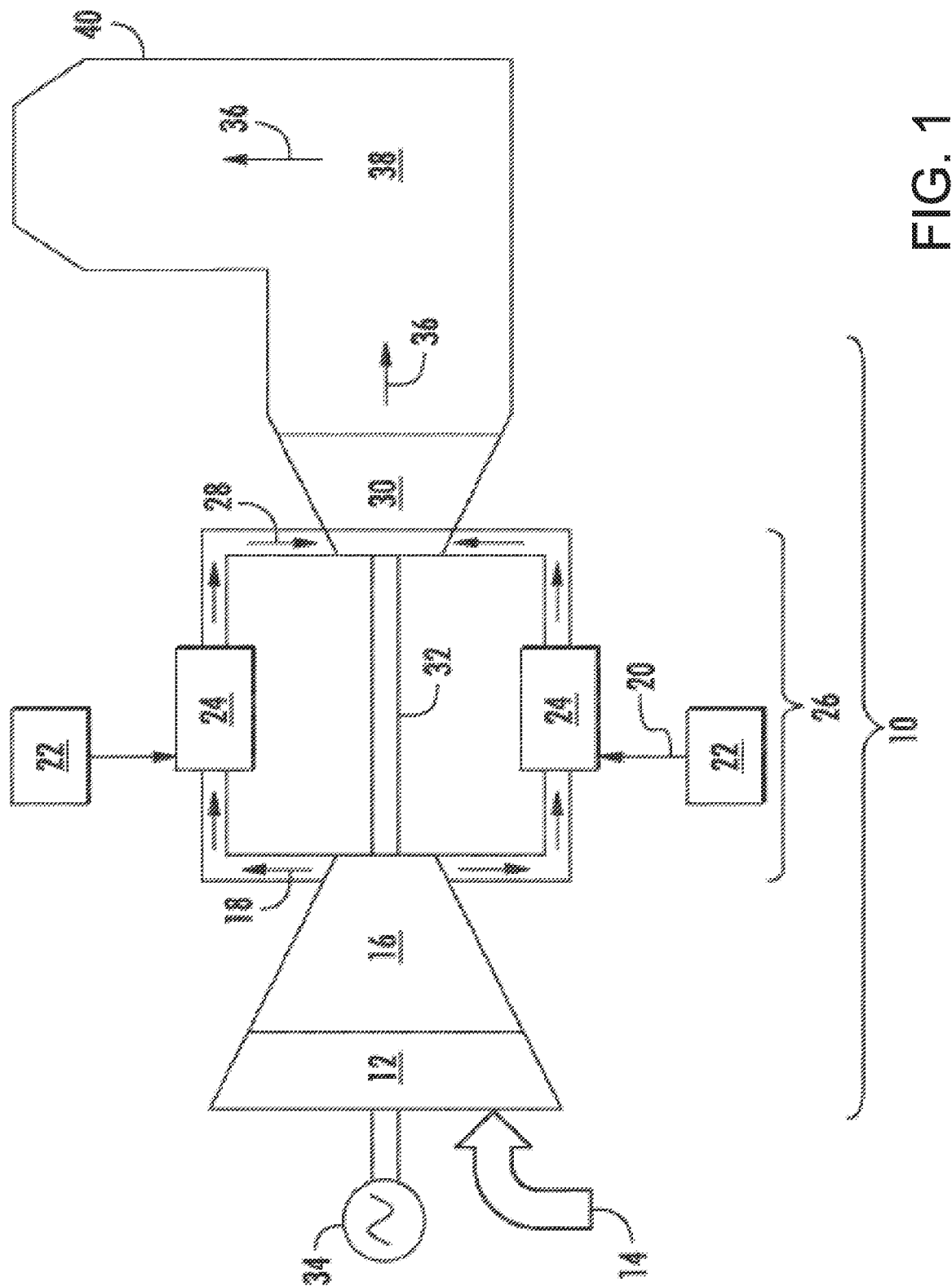
FIG. 1 is a functional block diagram of an exemplary gas turbine.

Referring now to the drawings, wherein identical numerals indicate the same elements throughout the figures, FIG. 1 provides a functional block diagram of an exemplary gas turbine 10 that may incorporate various embodiments of the present disclosure. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18.

The compressed working fluid 18 is mixed with a fuel 20 from a fuel source 22 such as a fuel skid to form a combustible mixture within one or more combustors 24 of a combustion section 26 of the gas turbine 10. The combustible mixture is burned to produce combustion gases 28 having a high temperature, pressure and velocity. The combustion gases 28 flow through a turbine 30 of a turbine section to produce work. For example, the turbine 30 may be connected to a shaft 32 so that rotation of the turbine 30 drives the compressor 16 to produce the compressed working fluid 18.

Alternately or in addition, the shaft 32 may connect the turbine 30 to a generator 34 for producing electricity. Exhaust gases 36 from the turbine 30 flow through an exhaust section 38 that connects the turbine 30 to an exhaust stack 40 downstream from the turbine 30. The exhaust section 38 may include, for example, a heat recovery steam generator (not shown) for cleaning and extracting additional heat from the exhaust gases 36 prior to release to the environment.

Figure 2:
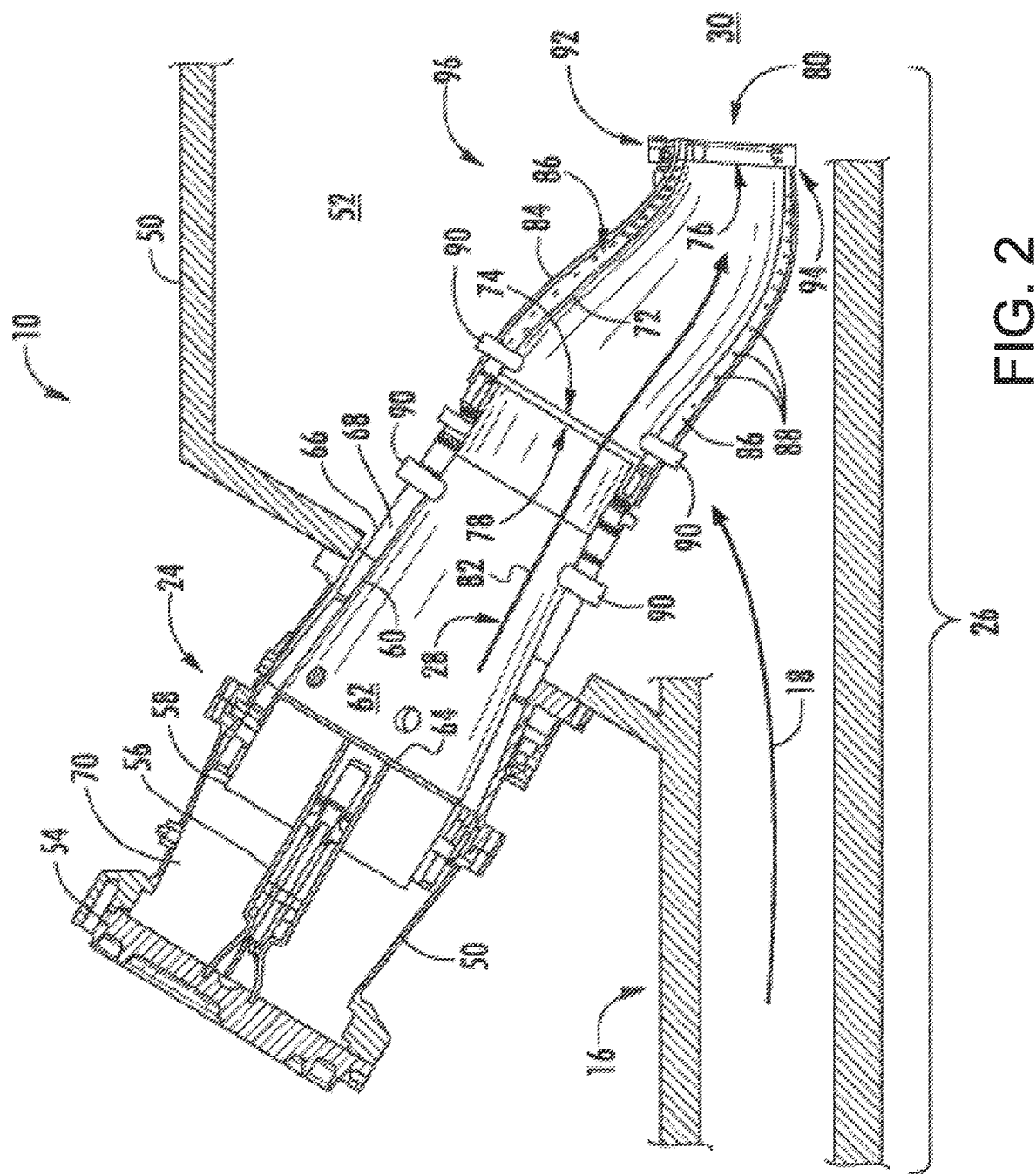
FIG. 2 illustrates a cross sectional side view of a portion of a gas turbine, including a combustor that may encompass various aspects of the present disclosure.

FIG. 2 provides a cross sectional side view of a portion of the gas turbine 10 including an exemplary combustor 24 as may be incorporated in various embodiments of the present invention. As shown in FIG. 2, the combustion section 26 includes an outer casing 50, such as a compressor discharge casing, disposed downstream from the compressor 16. The outer casing 50 at least partially surrounds the combustor 24. The outer casing 50 at least partially defines a high pressure plenum 52 that at least partially surrounds the combustor 24. The high pressure plenum 52 is in fluid communication with the compressor 16 so as to receive the compressed working fluid 18 from the compressor 16 during operation of the gas turbine 10.

An end cover 54 may be connected to the outer casing 50. In particular combustor designs, the end cover 54 is in fluid communication with the fuel source 22. A fuel nozzle 56 in fluid communication with the end cover 54 and/or the fuel source 22 extends downstream from the end cover 54. The fuel nozzle 56 extends generally axially through an annular cap assembly 58 disposed within the outer casing 50. An annular liner 60 such as a combustion liner or transition duct at least partially defines a combustion chamber 62 within the combustor 24 downstream from an outlet end 64 of the fuel nozzle 56. A flow sleeve 66 may circumferentially surround at least a portion of the liner 60. The flow sleeve 66 is radially separated from the liner 60 so as to define a flow passage 68 therebetween. The flow passage 68 is in fluid communication with the combustion chamber 62 via a head end portion 70 of the combustor 24. The head end portion 70 may be at least partially defined by the end cover 54 and/or the outer casing 50.

A transition duct (or transition piece) 72 extends downstream from the combustion chamber 62. The transition piece 72 includes an upstream end 74 that is axially separated from a downstream end 76. In particular configurations, the upstream end 74 surrounds a downstream portion 78 of the annular liner 60. The downstream end 76 of the transition piece 72 terminates proximate to an inlet 80 of the turbine 30. The annular liner 60 and/or the transition piece 72 at least partially define a hot gas path 82 for routing the combustion gases 28 from the combustion chamber 62 through the high pressure plenum 52 and into the turbine 30.

An outer sleeve 84 such as an impingement or flow sleeve extends circumferentially around the transition duct 72. The outer sleeve 84 is radially separated from the transition duct 72 to define a cooling annulus 86 in the space therebetween. The outer sleeve 84 may include a plurality of cooling holes 88 or passages that provide for fluid communication between the high pressure plenum 52 and the cooling annulus 86. In one embodiment, the cooling annulus 86 is in fluid communication with the combustion chamber 62.

One or more fuel injectors 90, also commonly known as late lean fuel injectors, may extend through the outer sleeve 84, the cooling annulus 86 and the transition piece 72 to provide for fuel injection into the hot gas path 82 downstream from the combustion chamber 62. The fuel injectors 90 may extend through the flow sleeve 66, the flow passage 68 and the liner 60 to provide for fuel injection into the hot gas path 82 downstream from the combustion chamber 62. Other penetrations such as cross fire tubes, igniters, pressure probes and flame detectors may act as bluff bodies within the flow annulus 86, thus creating disturbances to the flow such as wakes.

An aft frame assembly (or aft frame) 92 is disposed at or proximate to the downstream end 76 of the transition piece 72. The aft frame 92 is integral with the downstream end 76 of the transition piece 72. A portion of the outer sleeve 84 such as a forward edge 94 may be integral or connected to the aft frame 92 to at least partially define the cooling annulus 86. The aft frame 92 and the transition piece 72 may be manufactured as a singular component. In the alternative, the aft frame 92 may be connected to the transition piece 72 via welding, brazing or any other suitable process. In one embodiment, the transition piece 72, the outer sleeve 84, the cooling annulus 86 and the aft frame 92 are provided as a transition piece assembly 96. The aft frame 92 generally provides structural support to reduce and/or prevent deformation of the downstream end 76 of the transition piece 72 during operation of the combustor. The aft frame 92 may provide a means for mounting the transition piece 72 within the outer casing 50.

Figure 3:
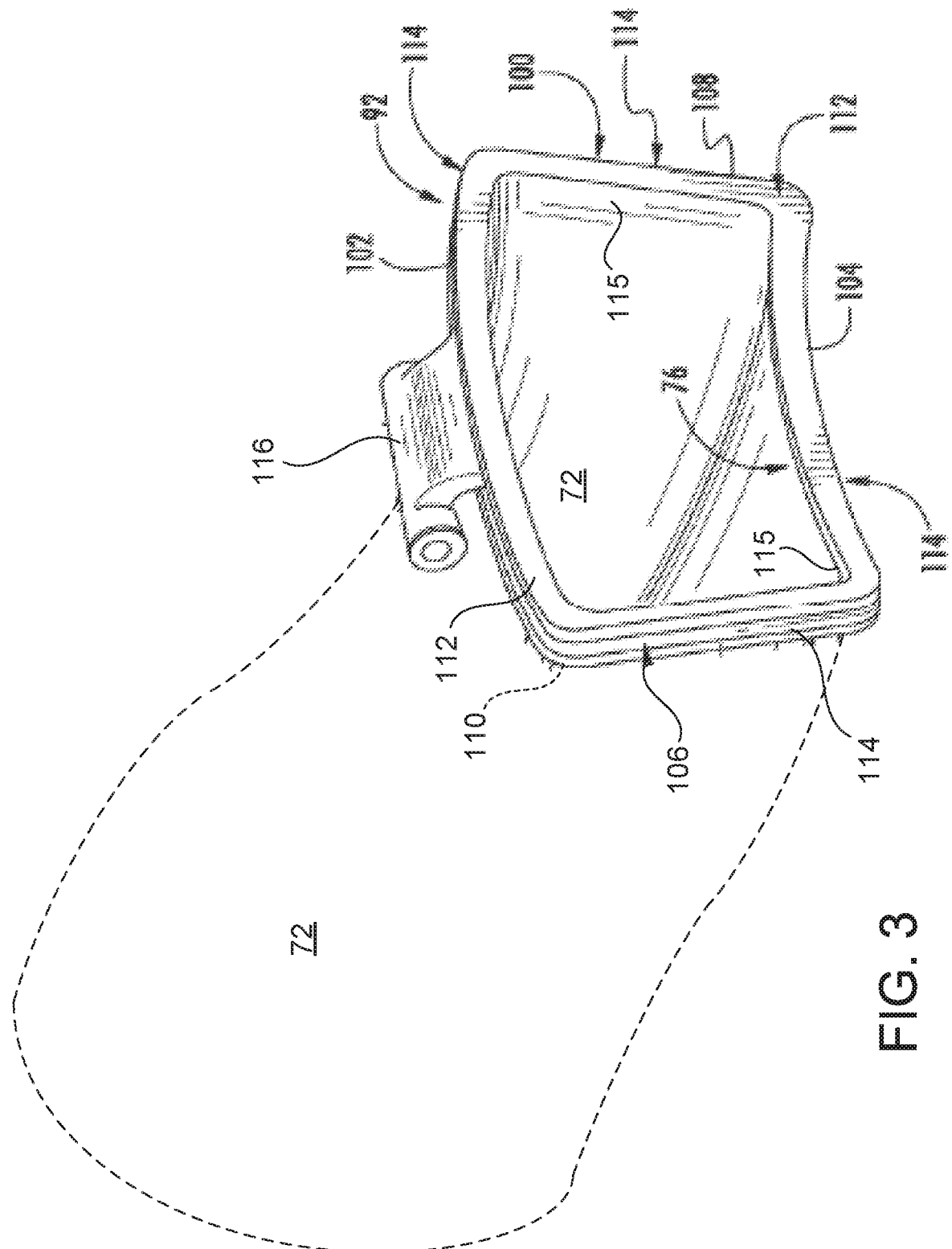
FIG. 3 illustrates a perspective view of an aft frame of the combustor as shown in FIG. 2, according to an aspect of the present disclosure.

As shown in FIG. 3, the aft frame 92 comprises a main body 100. The main body 100 includes an outer (or top) rail 102, an inner (or bottom) rail 104 and a first side rail 106 that is circumferentially separated from an opposing second side rail 108. The side rails are located on the sides of the aft frame, the outer rail is located on the top of the aft frame, and the inner rail is located on the bottom of the aft frame. Top rail 102 is located radially outward of bottom rail 104. The main body 100 further includes an upstream facing surface 110 (not visible in FIG. 3) separated from (and opposed to) a downstream facing surface 112, a radially outer facing surface 114 that extends around an outer perimeter of the main body 100 at least partially between the upstream facing surface 110 and the downstream facing surface 112, and a radially inner facing surface 115 that extends around an inner perimeter of the main body 100 at least partially between the upstream facing surface 110 and the downstream facing surface 112. The aft frame 92 may also include a mounting feature 116 for mounting the transition piece 72 and/or the transition piece assembly 96 (FIG. 2) within the gas turbine 10.

The side rails of the aft frame have unique cooling needs due to the transition from a "can" combustor to an "annular" hot gas path where the inner and outer rails match up to the hot gas path. However, the side rails of the aft frame have no corresponding part in the hot gas path and therefore are exposed to hot gases more directly than the inner and outer rails.

Figure 4:
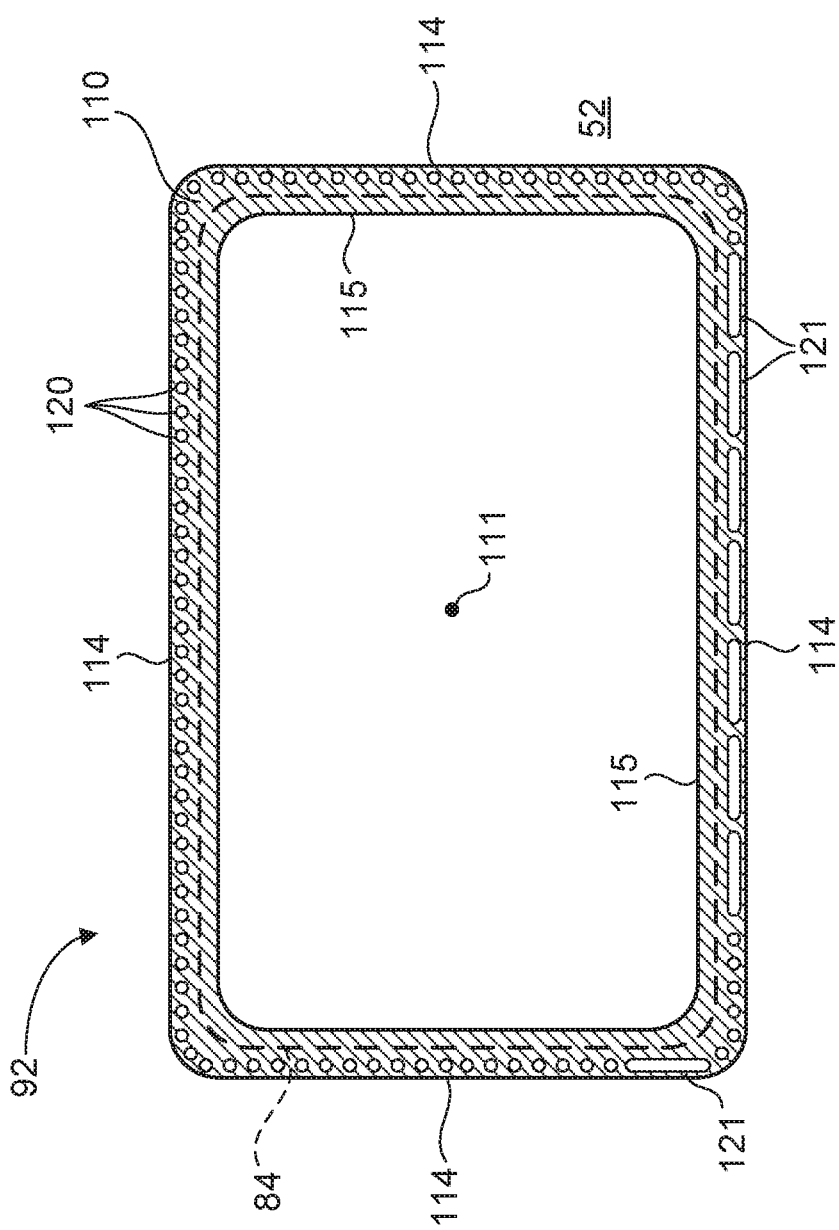
FIG. 4 illustrates a schematic view of the upstream facing surface of the aft frame assembly, according to an aspect of the present disclosure.

FIG. 4 illustrates a simplified, schematic view of the upstream facing surface 110 of aft frame 92. The upstream facing surface 110 includes a plurality of feed hole inlets 120 located thereon. Each of the feed hole inlets 120 is coupled to a cooling channel 122 (not shown) that passes through the main body 100. For example, one feed hole inlet 120 functions as the beginning of a respective cooling channel 122, so a plurality of feed hole inlets 120 correspond to an equal number of cooling channels 122. Alternatively, the feed hole inlets may comprise feed hole inlet slots 121, and one slot 121 may feed multiple cooling channels. The aft frame 92 may use feed hole inlets 120, or feed hole inlet slots 121, or both at the same time, as desired in the specific application. The source of air input to the feed hole inlets 120, 121 is compressor discharge air drawn from high pressure plenum 52. The outer sleeve 84 (or flow sleeve) is shown in phantom. The high pressure plenum 52 is outside the outer sleeve 84. The specific locations or configuration of the feed hole inlets 120, 121 and cooling channels may be tailored to the specific application, so that thermal gradients in the aft frame are minimized or reduced. The radially inner facing surfaces 115 of the aft frame 92 are typically hotter than the radially outer surface 114, so the microchannels are located nearer to or close to the radially inner facing surface 115. The phrases "radially inner" and "radially outer" are used with respect to central origin point 111, which is a central point with respect to aft frame 92.

Figure 5:
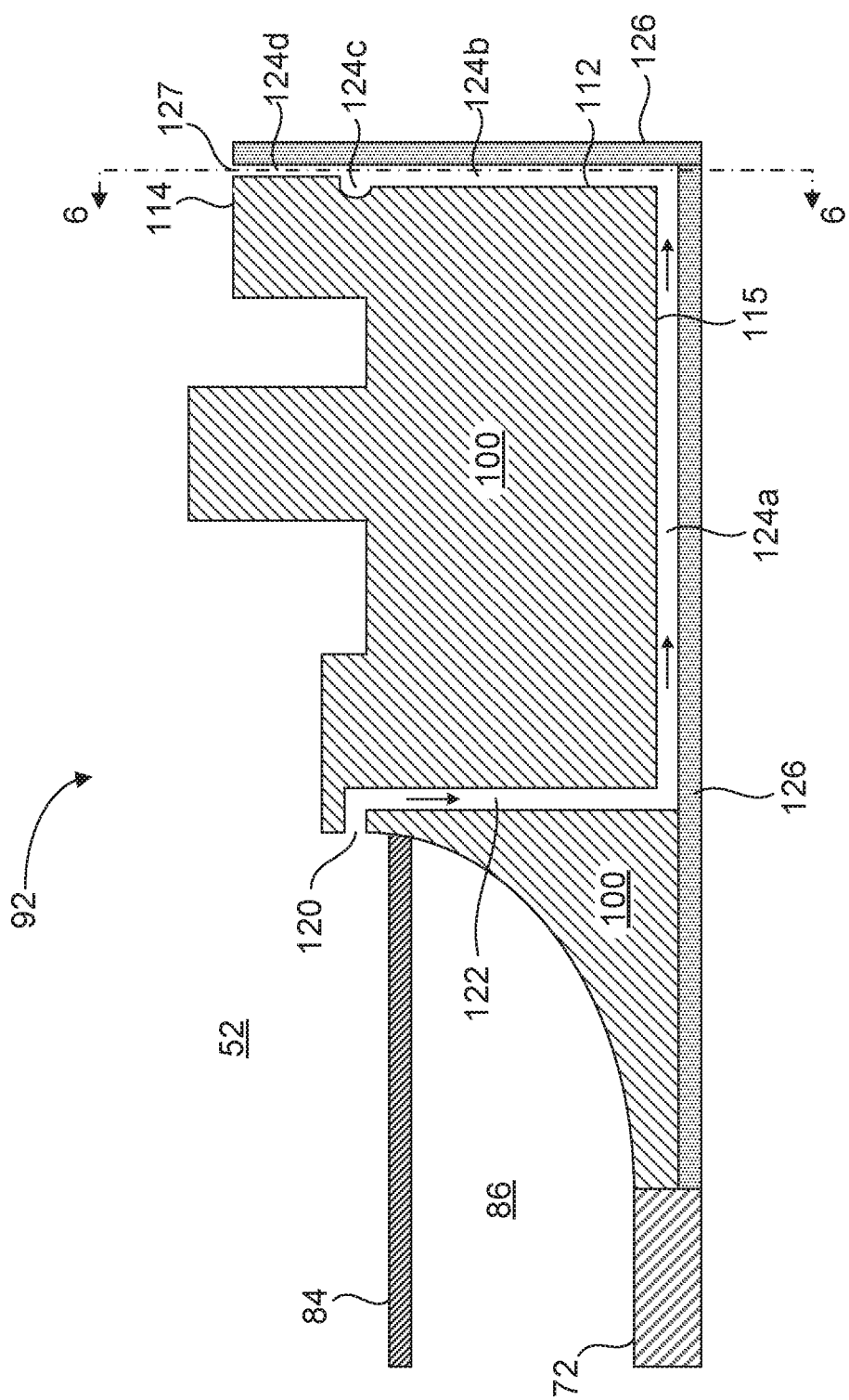
FIG. 5 illustrates a partial, perspective and axial cross-sectional view of the aft frame, according to an aspect of the present disclosure.

FIG. 5 illustrates a partial, perspective and axial cross-sectional view of the aft frame 92, according to an aspect of the present disclosure. The feed hole inlets 120 are located on the upstream facing surface 110 radially outward of the outer sleeve 84, and each feed hole inlet 120 is connected to a cooling channel 122. The cooling channels 122 pass through the main body 100 and may pass straight or axially through the main body, or may be angled with respect to an axial line passing through central origin point 111 (shown in FIG. 4). The term "axial" is with reference to the aft frame and is generally in the direction of the flow of combustion gasses. The term "radial" is any direction at right angles to the axial direction. An advantage of the present configuration is that the cooling channels 122 are fed by high pressure air from high pressure plenum 52. This enables the cooling air to rapidly reach the radially inner surface areas of the aft frame and provide cooling where it is needed. The cooling channels 122 are connected to and terminate (or exhaust into) microchannels 124. The microchannels will also be referred to with numerals 124a-124f, and the air flow progress from the 124a portion to the 124b portion and eventually exits after the 124d or 124f portions, as will be described hereinafter. Each cooling channel 122 may be connected to one or more microchannels 124 (i.e., 124a). This configuration is advantageous, because it minimizes or reduces the adverse effects of clogging of the microchannels. If one cooling channel or microchannel becomes clogged (or otherwise obstructed) the other cooling channels and microchannels will continue to provide cooling airflow to the aft frame. The feed hole inlet 120 may also be replaced by a feed hole slot 121, and one slot 121 may feed a plurality of cooling channels 122.

Each microchannel 124 (i.e., 124a) is formed in or near the radially inner facing surface 115, and extends at least partially along the downstream facing surface 112. The microchannels 124 may have depths in the range from approximately 0.2 millimeters (mm) to approximately 3 mm, or 0.5 mm to 1 mm, or any subranges therebetween. Further, the microchannels 124 may have widths in the range from approximately 0.2 mm to approximately 3 mm, or 0.5 mm to 1 mm, or any subranges therebetween. The length of each microchannel 124 will vary based on the distance from the cooling channel 122 outlet to the exit of the microchannel on the downstream facing surface or the radially outer facing surface 114 of the aft frame. For example, the microchannels 124 (i.e., 124f) may exit into the cooling annulus 86 and/or on the downstream facing surface 112 and/or on the radially outer facing surface 114 (as shown by microchannel 124d and exit hole 127). The aft frame 92 is typically located immediately upstream of a stage 1 nozzle, so cooling the side rail regions of the aft frame and the space between the aft frame and nozzle may be desired. An advantage to exhausting cooling air out of the side rails is that the temperature of the hot gas may be reduced between adjacent transition pieces, which will reduce thermal stresses and improve longevity and durability of the transition pieces and associated components.

The microchannel cooling slots 124 may be covered by a pre-sintered preform 126. The base alloy of the pre-sintered preform 126 can comprise any composition such as one similar to the main body 100 to promote common physical properties between the pre-sintered preform 126 and the main body 100. For example, in some embodiments, the base alloy and the main body share a common composition (i.e., they are the same type of material). In some embodiments, the base alloy can comprise nickel-based superalloys or cobalt-based superalloys. In some embodiments, the properties for the base alloy include chemical and metallurgical compatibility with the main body 100. A thermal barrier coating (not shown) may also be formed on the pre-sintered preform. A thermal barrier coating (TBC) reduces the temperature of the underlying component substrate and thereby prolongs the service life of the component. Ceramic materials and particularly yttria-stabilized zirconia (YSZ) are widely used as TBC materials because of their high temperature capability, low thermal conductivity, and relative ease of deposition by plasma spraying, flame spraying and physical vapor deposition (PVD) techniques.

Figure 6:
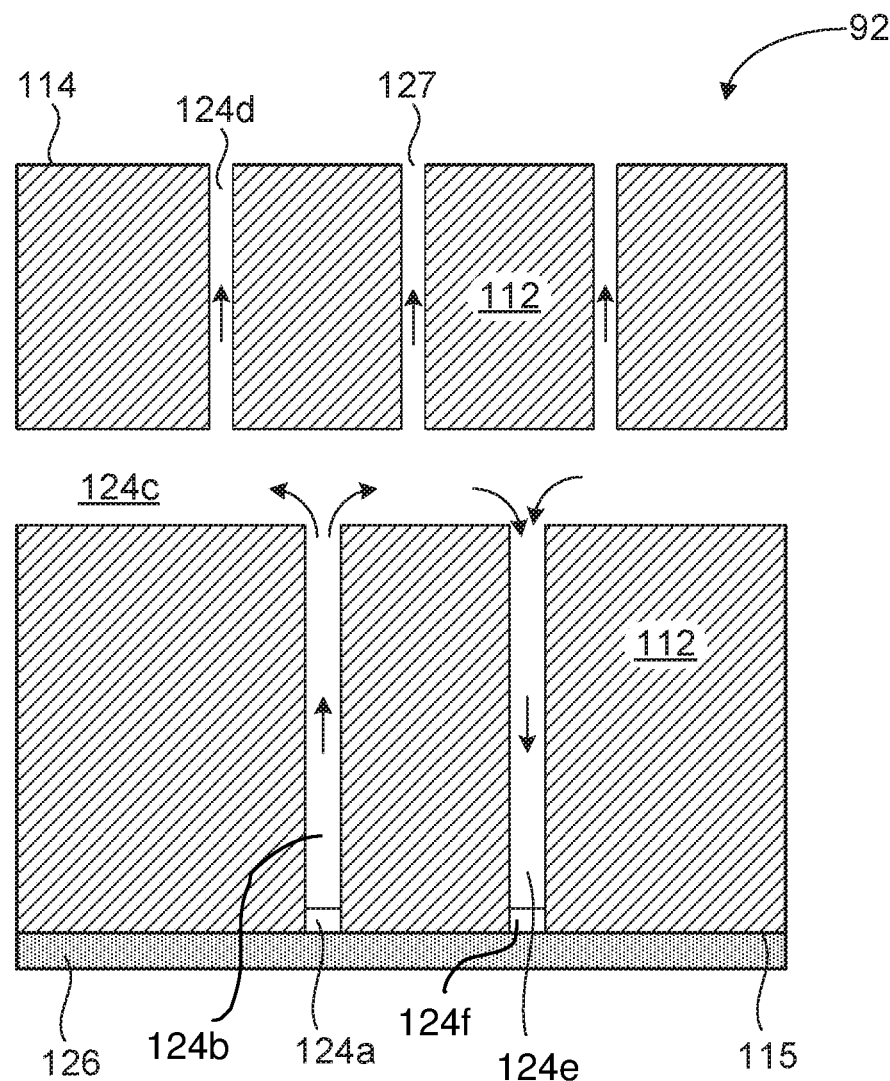
FIG. 6 illustrates a partial, schematic cross-sectional view of the aft frame along section lines 6-6 in FIG. 5, according to an aspect of the present disclosure.

FIG. 6 illustrates a partial, schematic cross-sectional view of the aft frame 92 along section lines 6-6 in FIG. 5, according to an aspect of the present disclosure. The microchannels 124a extend substantially axially along the radially inner surface 115 (as shown in FIG. 5) and microchannel 124b extends substantially radially while microchannel 124c extends substantially circumferentially along the downstream facing surface 112 (as shown in FIG. 6). The vertical oriented microchannels 124b (as drawn in FIG. 6) extend in the radial direction, and the horizontal microchannel 124c extends circumferentially along the downstream facing surface 112. The microchannel section 124c is the part of the microchannel that extends circumferentially, and this may be configured to have a larger cross-sectional area to handle flow from multiple individual microchannels. In the lower pair of microchannels 124, the axial extending microchannel may be seen adjacent to pre-sintered preform 126. In summary, the airflow through the microchannels begins in portion 124a, then flows radially through portion 124b, and circumferentially through portion 124c. After this point the airflow can exit through portion 124d, and/or follow a radial path through portion 124e and then an axial path through portion 124f and following exit cooling channel 123 to exit hole 128 (as shown in FIG. 7).

Figure 7:
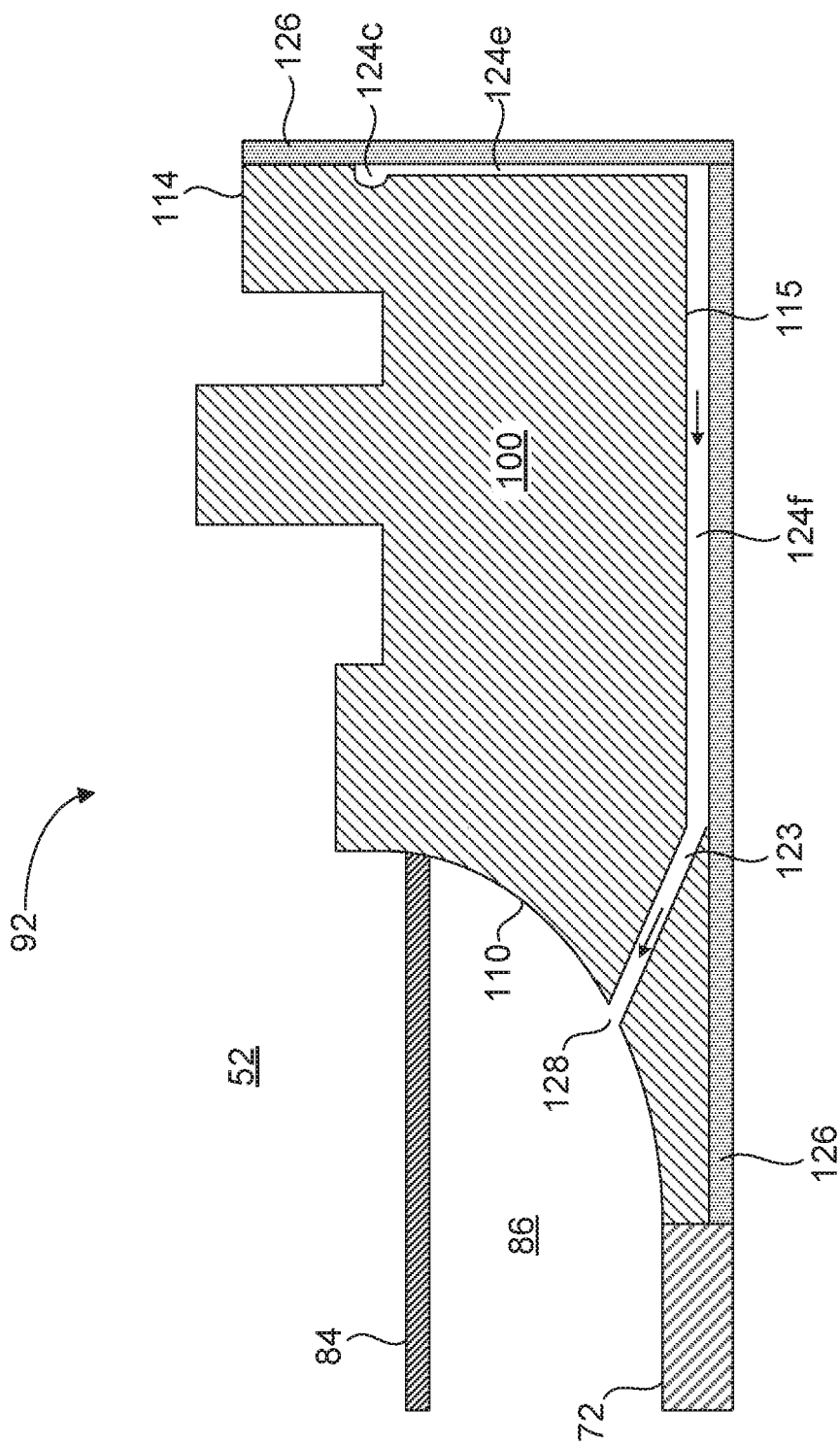
FIG. 7 illustrates a partial, perspective and axial cross-sectional view of the aft frame, according to an aspect of the present disclosure.

FIG. 7 illustrates a partial, perspective and axial cross-sectional view of the aft frame 92, according to an aspect of the present disclosure. The view of FIG. 7 is circumferentially spaced from the view shown in FIG. 5. The microchannel 124c feeds microchannel 124e which then routes into microchannel 124f. Microchannel 124f is connected to an exit cooling channel 123 which is connected to exit hole 128. The exit hole 128 is located on the upstream facing surface 110 and exhaust into the cooling annulus 86. A plurality of exit holes 128 may be located radially outward of transition piece 72 and radially inward of outer sleeve 84. The difference in pressure between the feed hole inlets 120 (high pressure plenum) and the lower pressure at the exit holes 128 (due to lower pressure in the cooling annulus) facilitates cooling airflow through the cooling channels and microchannels.

Figure 8:
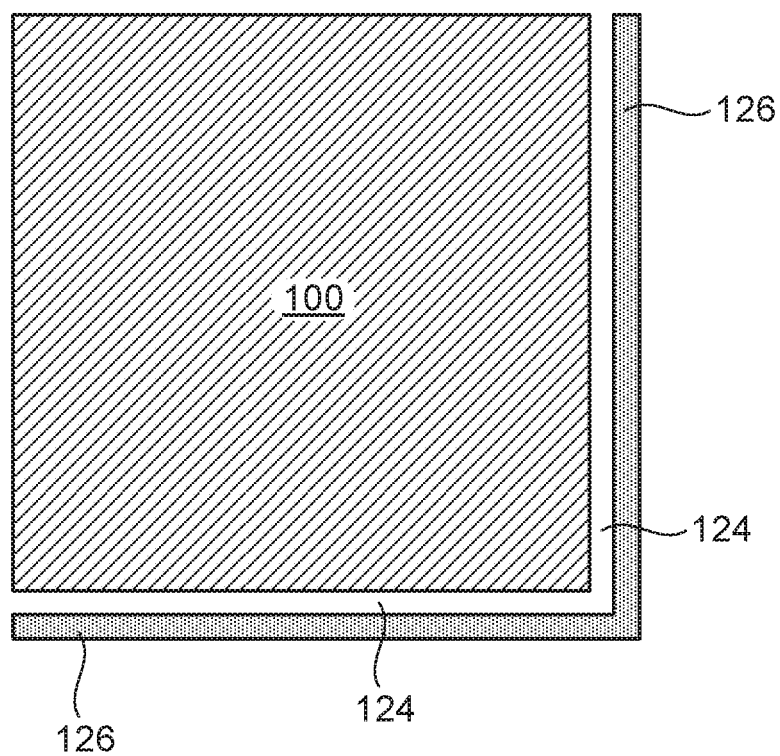
FIG. 8 illustrates a partial and simplified cross-sectional view of the aft frame with microchannels formed in the pre-sintered preform, according to an aspect of the present disclosure.

Alternatively and as shown in FIG. 8, the microchannels 124 may be formed in the pre-sintered preform 126. This configuration may simplify aft frame fabrication as it may be easier to form microchannels in the pre-sintered preform 126 layer by using near net shape or metal printing (e.g., additive manufacturing) approaches. The microchannels may be formed adjacent to the main body 100 (as shown), or adjacent to a thermal barrier coating (not shown). Furthermore, the microchannel cooling slots 124 may be configured to be straight, curved or serpentine, to obtain the desired degree of cooling of the aft frame.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An aft frame assembly for a transition piece of a gas turbine, the transition piece is located within an outer sleeve having a plurality of cooling holes, a cooling annulus is formed in a space between the transition piece and the outer sleeve, a high pressure plenum surrounds an exterior of the outer sleeve, the aft frame assembly comprising:
   a main body comprising an upstream facing surface, a downstream facing surface, a radially outer facing surface and a radially inner facing surface;
   a plurality of feed hole inlets are located on the upstream facing surface and radially outward of the outer sleeve so that the plurality of feed hole inlets are located to receive input from the high pressure plenum, the plurality of feed hole inlets coupled to a plurality of cooling channels passing through the main body;
   a plurality of microchannels are formed in or near the radially inner facing surface and the downstream facing surface, wherein the plurality of microchannels comprise:
      a first plurality of microchannels extending in a downstream direction oriented along the radially inner facing surface toward the downstream facing surface, wherein the plurality of cooling channels are connected to and terminate in the first plurality of microchannels;

a second plurality of microchannels extending in one or more directions oriented along the downstream facing surface; and a third plurality of microchannels extending in an upstream direction oriented along the radially inner facing surface from the downstream facing surface toward the cooling annulus, wherein the first and third pluralities of microchannels are circumferentially spaced apart from one another; and a plurality of exit holes are connected to the plurality of microchannels, wherein the plurality of exit holes comprises a first plurality of exit holes fluidly coupled to the third plurality of microchannels, the first plurality of exit holes are located radially outward of the transition piece and radially inward of the outer sleeve, and the first plurality of exit holes are located to exhaust into the cooling annulus.

2. The aft frame assembly of claim 1, further comprising:
a pre-sintered preform located over the plurality of microchannels and on the radially inner facing surface and the downstream facing surface of the main body.

3. The aft frame assembly of claim 2, wherein the first plurality of microchannels and the third plurality of microchannels extend substantially axially along the radially inner facing surface.

4. The aft frame assembly of claim 3, wherein the second plurality of microchannels extends in the one or more directions substantially radially and circumferentially along the downstream facing surface.

5. The aft frame assembly of claim 4, wherein the plurality of exit holes comprises a second plurality of exit holes located on the radially outer facing surface and located to exhaust into the high pressure plenum.

6. The aft frame assembly of claim 1, wherein the first, second, and third pluralities of microchannels are fluidly coupled together.

7. The aft frame assembly of claim 6, wherein the second plurality of microchannels comprise a first microchannel fluidly coupled to one of the first plurality of microchannels, a second microchannel fluidly coupled to the first microchannel, and a third microchannel fluidly coupled to the second microchannel and one of the third plurality of microchannels, wherein the first microchannel extends in a radially outward direction oriented along the downward facing surface, the second microchannel extends in a circumferential direction oriented along the downward facing surface, and the third microchannel extends in a radially inward direction oriented along the downward facing surface.

8. The aft frame assembly of claim 1, wherein the plurality of microchannels are formed in a pre-sintered preform.

9. The aft frame assembly of claim 1, wherein each microchannel of the first and second pluralities of microchannels comprises a linear microchannel extending in an axial direction.

10. The aft frame assembly of claim 1, wherein each microchannel of the first and second pluralities of microchannels is disposed at a common radial position.

11. A transition piece having an aft frame assembly, the transition piece is located within an outer sleeve having a plurality of cooling holes, a cooling annulus is formed in a space between the transition piece and the outer sleeve, a high pressure plenum surrounds an exterior of the outer sleeve, the aft frame assembly comprising:

a main body comprising an upstream facing surface, a downstream facing surface, a radially outer facing surface and a radially inner facing surface;

a plurality of feed hole inlets are located on the upstream facing surface and radially outward of the outer sleeve so that the plurality of feed hole inlets are located to receive input from the high pressure plenum, the plurality of feed hole inlets coupled to a plurality of cooling channels passing through the main body;

a plurality of microchannels are formed in or near the radially inner facing surface and the downstream facing surface, wherein the plurality of microchannels comprise:

a first plurality of microchannels extending in a downstream direction oriented along the radially inner facing surface toward the downstream facing surface, wherein the plurality of cooling channels are connected to and terminate in the first plurality of microchannels;

a second plurality of microchannels extending in one or more directions oriented along the downstream facing surface; and a third plurality of microchannels extending in an upstream direction oriented along the radially inner facing surface from the downstream facing surface toward the cooling annulus, wherein the first and third pluralities of microchannels are circumferentially spaced apart from one another; and a plurality of exit holes are connected to the plurality of microchannels, wherein the plurality of exit holes comprises a first plurality of exit holes fluidly coupled to the third plurality of microchannels, the first plurality of exit holes are located radially outward of the transition piece and radially inward of the outer sleeve, and the first plurality of exit holes are located to exhaust into the cooling annulus.

12. The transition piece of claim 11, further comprising:
a pre-sintered preform located over the plurality of microchannels and on the radially inner facing surface and the downstream facing surface of the main body.

13. The transition piece of claim 11, wherein the first plurality of microchannels and the third plurality of microchannels extend substantially axially along the radially inner facing surface.

14. The transition piece of claim 11, wherein the second plurality of microchannels extends in the one or more directions substantially radially and circumferentially along the downstream facing surface.

15. The transition piece of claim 11, wherein the plurality of exit holes comprises a second plurality of exit holes located on the radially outer facing surface and located to exhaust into the high pressure plenum.

16. The transition piece of claim 11, wherein the first, second, and third pluralities of microchannels are fluidly coupled together.

17. The transition piece of claim 11, wherein the plurality of microchannels are formed in a pre-sintered preform.

18. A gas turbine comprising:
a compressor;
a combustion section disposed downstream from the compressor, the combustion section being in fluid communication with the compressor;
a turbine disposed downstream from the combustion section;

the combustion section comprising an aft frame assembly having a main body comprising an upstream facing surface, a downstream facing surface, a radially outer facing surface and a radially inner facing surface, the combustion section having a transition piece located within an outer sleeve having a plurality of cooling holes, a cooling annulus is formed in a space between the transition piece and the outer sleeve, a high pressure plenum surrounds an exterior of the outer sleeve, the aft frame assembly comprising:

a plurality of feed hole inlets are located on the upstream facing surface and radially outward of the outer sleeve so that the plurality of feed hole inlets are located to receive input from the high pressure plenum, the plurality of feed hole inlets coupled to a plurality of cooling channels passing through the main body;

a plurality of microchannels are formed in or near the radially inner facing surface and the downstream facing surface, wherein the plurality of microchannels comprise:

a first plurality of microchannels extending in a downstream direction oriented along the radially inner facing surface toward the downstream facing surface, wherein the plurality of cooling channels are connected to and terminate in the first plurality of microchannels;

a second plurality of microchannels extending in one or more directions oriented along the downstream facing surface; and a third plurality of microchannels extending in an upstream direction oriented along the radially inner facing surface from the downstream facing surface toward the cooling annulus, wherein the first and third pluralities of microchannels are circumferentially spaced apart from one another; and a plurality of exit holes are connected to the plurality of microchannels, wherein the plurality of exit holes comprises a first plurality of exit holes fluidly coupled to the third plurality of microchannels, the first plurality of exit holes are located radially outward of the transition piece and radially inward of the outer sleeve, and the first plurality of exit holes are located to exhaust into the cooling annulus.

19. The gas turbine of claim 18, further comprising:

a pre-sintered preform located over the plurality of microchannels, wherein the pre-sintered preform comprises a first portion located over the first and third pluralities of microchannels on the radially inner facing surface and a second portion located over the second plurality of microchannels on the downstream facing surface of the main body, wherein the first and second portions of the pre-sintered preform are coupled together.

20. The gas turbine of claim 19, wherein the first plurality of microchannels and the third plurality of microchannels extend substantially axially along the radially inner facing surface.

21. The gas turbine of claim 19, wherein the second plurality of microchannels extends in the one or more directions substantially radially and circumferentially along the downstream facing surface.

22. The gas turbine of claim 19, wherein the plurality of exit holes comprises a second plurality of exit holes located on the radially outer facing surface and located to exhaust into the high pressure plenum.

23. The gas turbine of claim 18, wherein the first, second, and third pluralities of microchannels are fluidly coupled together.

* * * * *